United States Patent

Michie et al.

[11] Patent Number: 5,744,794
[45] Date of Patent: Apr. 28, 1998

[54] APPARATUS FOR DETECTING AQUEOUS ENVIRONMENTS

[75] Inventors: Walter Craig Michie; Neil Bette Graham, both of Glasgow; Brian Culshaw; Peter Thomas Gardiner, both of Kilmacolm; Christopher Raymond Moran, Glasgow, all of United Kingdom

[73] Assignee: University of Strathclyde, Glasgow, United Kingdom

[21] Appl. No.: 495,566

[22] PCT Filed: Feb. 14, 1994

[86] PCT No.: PCT/GB94/00292

§ 371 Date: Dec. 13, 1995

§ 102(e) Date: Dec. 13, 1995

[87] PCT Pub. No.: WO94/18536

PCT Pub. Date: Aug. 18, 1994

[30] Foreign Application Priority Data

Feb. 13, 1993 [GB] United Kingdom ............... 9302903

[51] Int. Cl.⁶ .................. G01M 3/04; G02B 6/44
[52] U.S. Cl. .................. 250/227.16; 385/13; 250/227.25
[58] Field of Search ............... 250/227.14, 227.16, 250/227.17, 227.18, 227.19, 227.21, 227.23, 227.24, 227.25, 577, 573; 385/12, 13

[56] References Cited

U.S. PATENT DOCUMENTS

| | | |
|---|---|---|
| 4,125,822 | 11/1978 | Perren et al. |
| 4,386,269 | 5/1983 | Murphy ............... 250/227.25 |
| 4,812,014 | 3/1989 | Sawano et al. ............... 250/227.14 |
| 5,140,847 | 8/1992 | Tausch et al. ............... 73/40 |
| 5,172,730 | 12/1992 | Driver ............... 138/104 |
| 5,180,622 | 1/1993 | Berg et al. ............... 428/192 |
| 5,430,815 | 7/1995 | Shen et al. ............... 385/13 |
| 5,493,113 | 2/1996 | Dunphy et al. ............... 250/227.14 |
| 5,551,484 | 9/1996 | Charboneau ............... 138/104 |

FOREIGN PATENT DOCUMENTS

| | | |
|---|---|---|
| 0245753 | 11/1987 | European Pat. Off. |
| 90/10208 | 9/1990 | WIPO |

OTHER PUBLICATIONS

"Water Sensor With Optical Fiber", Journal of Lightwave Technology, vol. 8, No. 12, Dec. 01, 1990, pp. 1829–1832, Shigeru Tomita et al., Dec. 1990.

"Simple Fibre–Optic Sensor for Detecting Water Penetration Into Optical Fibre Cables", Electronics Letters, vol. 19, No. 23, Nov. 1, 1993, pp. 980–982, A.G.W.M. De Jongh, Nov. 1983.

*Primary Examiner*—Edward P. Westin
*Assistant Examiner*—John R. Lee
*Attorney, Agent, or Firm*—Bell Seltzer Intellectual Property Law Group of Alston & Bird llp

[57] ABSTRACT

A system for detecting the presence of a target measurand, such as water or specified chemicals which are carried in an aqueous solution, and which includes a fibre-optic probe assembly which incorporates an optical fibre, a thin film of a water swellable hydrogel, and a rigid containment structure. The hydrogel is in contact with the optical fibre such that a volumetric change in the hydrogel causes a microbend of the optical fiber. The microbend is detected by a sensor assembly which is coupled to the probe assembly.

10 Claims, 4 Drawing Sheets

APPARATUS FOR DETECTING AQUEOUS ENVIRONMENTS

BACKGROUND OF THE INVENTION

This invention relates to a detection system for use in detecting the presence of a particular or target measurand. The system has particular utility in the detection of target measurands which are transported by aqueous means. One example is the ingress of aqueous measurands into the interior of post-tensioned reinforced concrete sections.

Many large structures, such as road bridges, are constructed using post-tensioned reinforced concrete sections. This construction technique requires that steel tendons be inserted through ducts which run through the length of a concrete section. These tendons are tensioned in order to apply a compressive load to the concrete. The remaining area within the ducts is filled with cement-based grout which forms a seal around the tendons intended to prevent the ingress of moisture and de-icing salts which would otherwise promote corrosion of the steel, thus weakening the structure. However, in structures such as road bridges, settlement and the vibrations produced by traffic tend to crack the concrete and the grout, allowing water and other substances (e.g. chlorine) to reach the tendons, which are then subject to corrosion. Replacement of such corroded tendons is a difficult, and very expensive task.

Another example where detection of aqueous measurands is desirable is within electrical or optical fibre cable duct systems where there may be a danger of corrosion penetrating the insulation material and giving rise to an electrical short circuit fault, or to loss of optical transmission. Aqueous measurands may also be measured in situations of loss thereof from a container system (e.g. loss of fluid from a pipeline) or as a measure of quality of a fluid in a pipeline. However, the measurand need not be borne directly or indirectly by aqueous means, for example it may be irradiation borne.

It is an object of the present invention to provide a detection system which is capable of detecting the presence of such measurands, and thus allow repairs or other control measures to be carried out.

SUMMARY OF THE INVENTION

According to the present invention there is provided a detecting system for use in detecting the presence of a target measurand, said system comprising:

a fibre-optic probe assembly incorporating an optical fibre which is subject to micro bending at intervals along its length, the probe assembly comprising a rigid containment structure which is filled with the length of optical fibre and a body of material which is subject to a volumetric change on exposure to said target measurand; and a sensor assembly coupled to the probe assembly, the sensor assembly having optical signal transmitting and receiving means arranged to identify optical fibre microbend changes arising, in use, from forces imposed locally on the fibre by the interaction of the rigid containment structure and volumetric changes in the body of material, characterised in that said body of material comprises a hydrogel based polymer.

The system may be used simply to detect the presence of a target measurand at an unspecified location along the length of the optical fibre, though it is preferred that said signal transmitting and receiving means is also capable of detecting the particular location on the optical fibre where the signal carrying property of the optical fibre has changed and thus also detecting the particular location of the affected portion of the body of material (which is preferably elongate).

In a modification the system may have more than one probe assembly in which case the sensor assembly is provided with a logic function output circuit to decipher the effects of different target measurands on the different hydrogel based polymers of the different probe assemblies.

The body of material may be extended to form a continuous rod or may be deposited as a coating on a former. Preferably the thickness of the coating is less than 50 microns.

The body of material may expand on exposure to one target measurand, and may contract on exposure to another target measurand to be detected.

The exposure of the body of material to a target measurand may result in a permanent change in volume, or the material may return to its original configuration on removal of the target measurand.

Preferably also, the hydrogel based polymer has chemical characteristics tailored to provide responsiveness of the target measurand.

The specific target measurands to be detected may be selected from pH, selected ions, certain chemicals, all of which are transported by aqueous means and photoirradiation and temperature.

The body of material may comprise a second component, said second component being tailored to provide responsiveness to the target measurand. The second component can either through interaction with the hydrogel, or alone, be subject to volumetric change on exposure to said target measurand.

Preferably also, the containment structure comprises a sheath for externally protecting the optical fibre and the body of material from external disturbance, which sheath is porous to allow the body of material to be exposed to the target measurand. Alternatively, the sheath may be non-porous but sacrificially corrodible in the presence of the target measurand.

If the signal transmitting and receiving means produces pulses of optical energy into the optical fibre the backscattered energy resulting from such microbends may be measured as a function of time, or distance travelled along the fibre length. This technique is known as Optical Time Domain Reflectometry (OTDR), and an earlier application of OTDR is described in EP A 0 490 849.

BRIEF DESCRIPTION OF THE DRAWINGS

The optical fibre is preferably bound to the body of material, which preferably is elongate, by an inelastic third member. Most preferably, the third member is thread-like in form. With this arrangement, expansion or contraction of a portion of the body of material causes the thread-like member to bite into, or relax its grip on the optical fibre at one or more distinct locations, thus increasing or decreasing the microbends formed in the optical fibre by the thread-like member and facilitating detection and location of the presence of the target measurand.

The system has particular utility in post-tensioned reinforced concrete sections. The system may be used during construction to ensure that the ducts in which the steel tendons are located are properly filled with protective grout, the system detecting the presence of the hydroxyl ions which migrate from the wet grout to the body of material. Thus, the system is actually being used to detect the absence of a specified condition, that is a level of alkalinity, to indicate improper filling of the duct with grout. In a finished section, the system may be used to detect the ingress of aqueous substances such as dissolved chlorine, or salts, particularly de-icing road salt, which have the potential to corrode or otherwise affect the steel tendon or the concrete.

Figure 1:
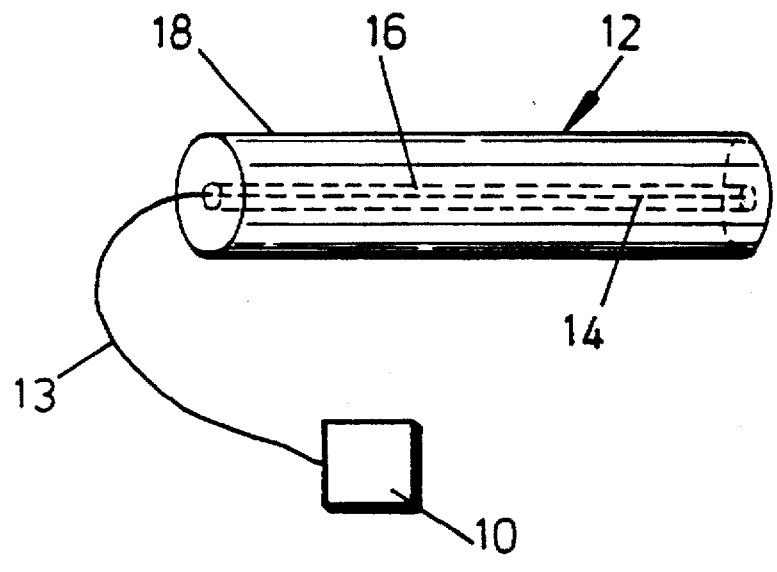
Figure 2:
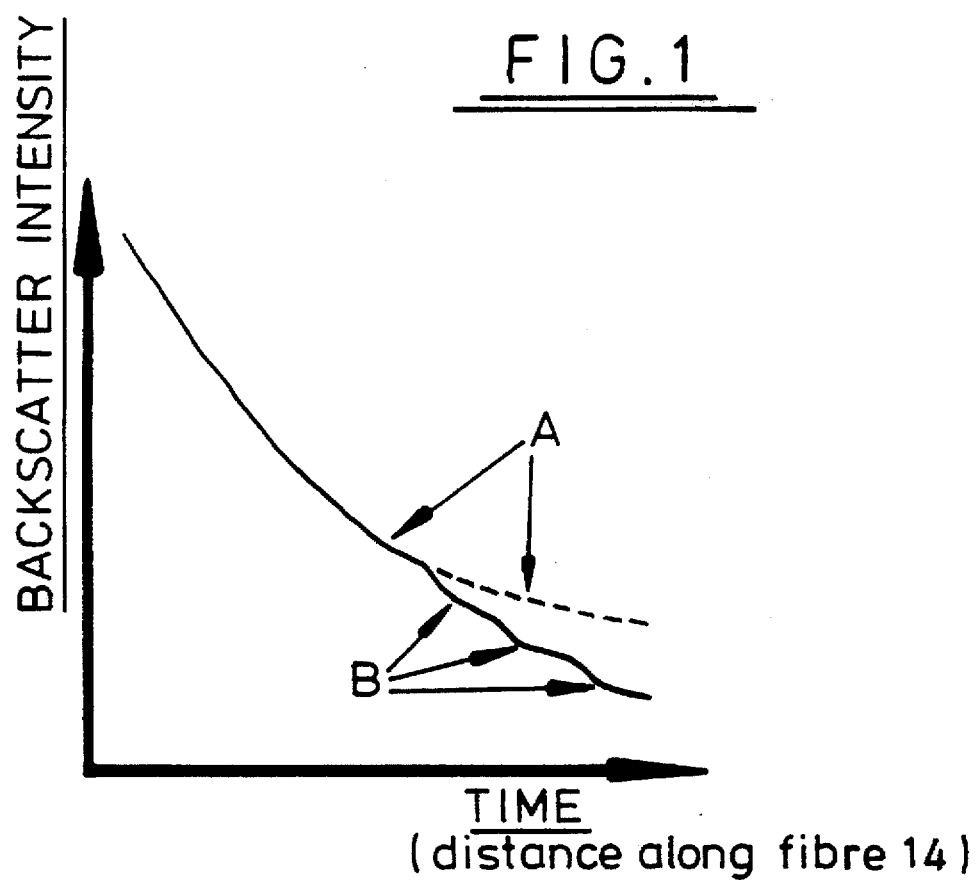
Figure 3A:
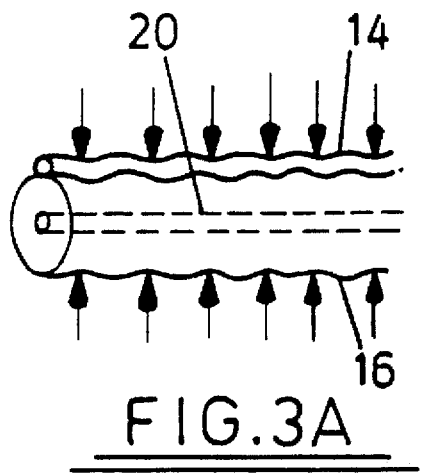
Figure 3B:
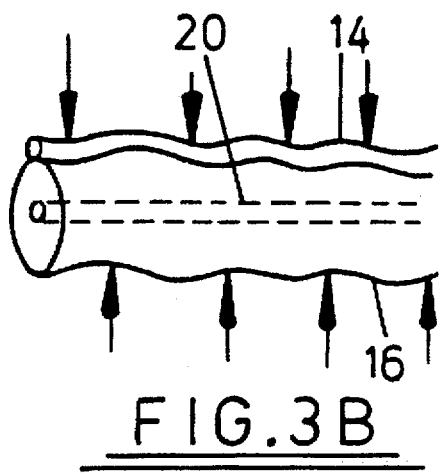
Figure 4A:
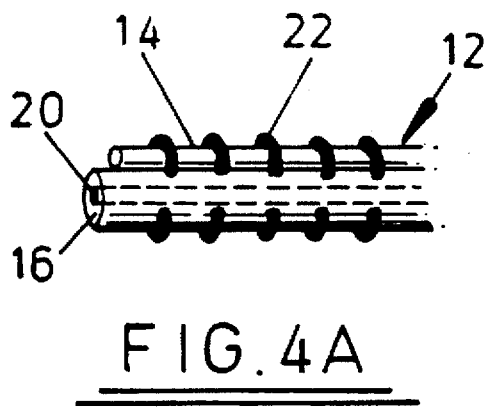
Figure 4C:
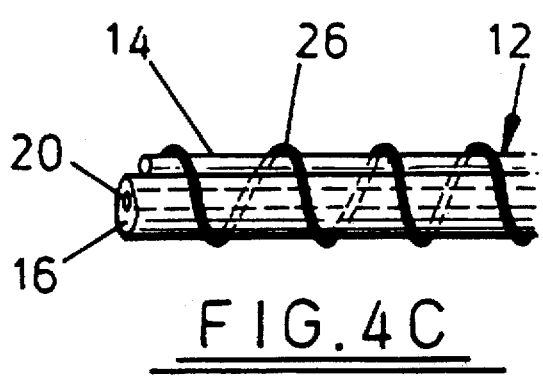
Figure 4B:
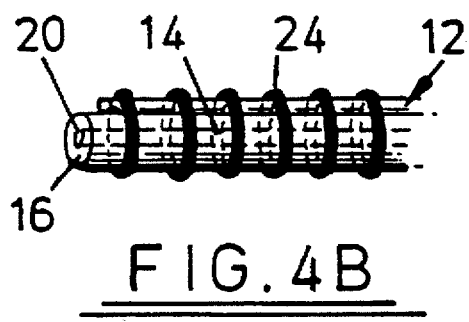
Figure 4D:
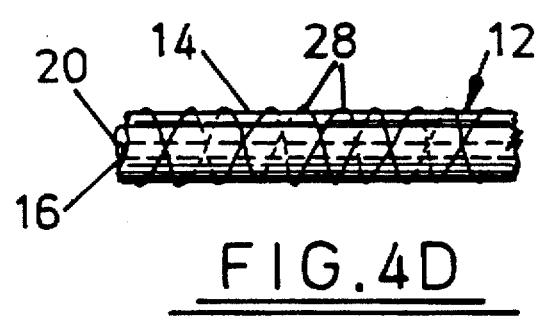
Figure 5:
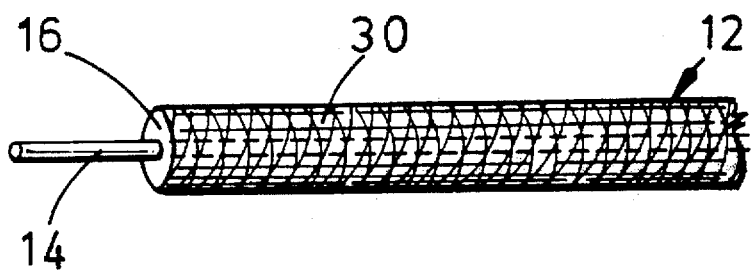
Figure 6:
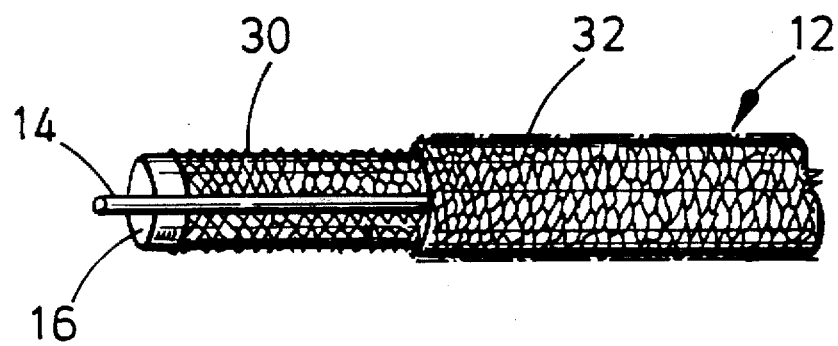
Figure 7A:
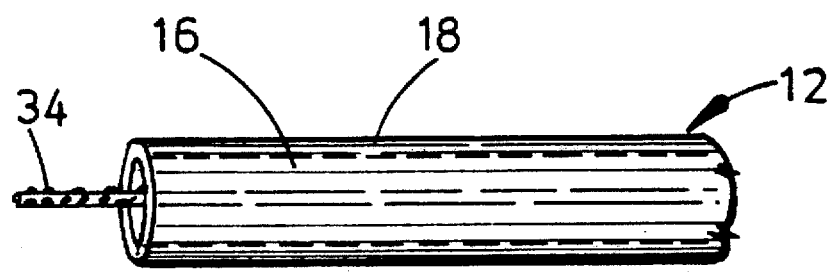
Figure 7B:
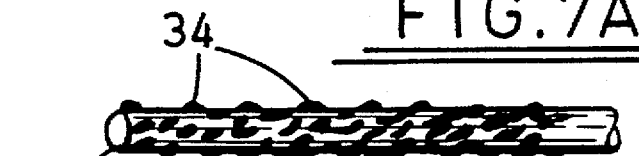

Embodiments of the present invention will now be described by way of example, with reference to the accompanying drawings in which;

FIG. 1 is a somewhat schematic view of a detection system;

FIG. 2 is a graph showing the backscatter intensity profile of an optical fibre of the system of FIG. 1 and showing microbend loss regions;

FIGS. 3A and 3B, are schematic views of a sensor cable showing different microbend characteristics;

FIGS. 4A, 4B, 4C and 4D are perspective views of various embodiments of sensor cables with restraining means attached;

FIGS. 5, 6 & 7A are views similar to FIG. 4 showing further embodiments of a sensor cable;

FIG. 7B is a more detailed view of a feature of FIG. 7A; and

FIGS. 8A, 8B, 8C, 8D and 8E are side views of various embodiments of a flat sensor cable.

DETAILED DESCRIPTION OF THE PREFERRED EMBODIMENTS

FIG. 1 of the drawings illustrates a detecting system which comprises a sensor assembly 10 coupled via an optical fibre 13 to a fibre optic probe assembly 12 wherein a length of optical fibre 14, at least in use (as will be explained), is subject to microbending at intervals along its length. Fibres 13 and 14 are preferably identical. The sensor assembly 10 includes an optical signal transmitter and receiver and operates as an Optical Time Domain Reflectometer (OTDR). The operation of the OTDR 10 (described more fully in EP0490849) is essentially the following. Short pulses of optical energy are launched into the optical fibre 13, which is preferably multi-moded with a graded index core. As each pulse travels down the fibre length 14, energy is scattered and some of this energy is recaptured and guided back up the optical fibres 13, 14, towards the assembly 10 where it is detected and measured. Correlating the received backscatter energy with the time of launch of the pulse allows an estimation (curve A, FIG. 2) to be made of backscatter signal strength as a function of position along the optical fibre 14. Positions of higher than usual loss i.e. arising from microbends can be identified and located along the optical fibre 14 length (as depicted at B in FIG. 2). Within the probe assembly 12, the optical fibre 14 is arranged in association with a body of material 16 and a rigid containment structure 18 in a geometrical configuration such that under exposure to the measurand of interest on permeation of the structure 18, the optical fibre 14, is mechanically disturbed, either creating a new microbend or changing an existing microbend so as to exhibit a change in its loss characteristics local to the point of measurand influence. In accordance with the present invention the body of material 16 is selected to comprise a hydrogel based polymer.

Hydrogels are three dimensional networks of hydrophilic polymers which have been tied together to form water-swellable but water insoluble structures. The term hydrogel is to be applied to hydrophilic polymers in a dry state (xerogel) as well as in a wet state. These hydrogels can be tied together in a number of ways. Firstly, radiation or radical cross-linking of hydrophilic polymers, examples being poly(acrylic acids), poly(methacrylic acids), poly (hydroxyethylmethacrylates), poly(glyceryl methacrylate), poly(vinyl alcohols), poly(ethylene oxides), poly (acrylamides), poly(N-acrylamides), poly(N,N-dimethylaminopropyl-N'-acrylamide), poly(ethylene imines), sodium/potassium poly(acrylates), polysacharides e.g. xanthates, alginates, guar gum, agarose etc., poly(vinyl pyrrolidone) and cellulose based derivatives. Secondly, chemical cross-linking of hydrophilic polymers and monomers, with appropirate polyfunctional monomers, examples include poly(hydroxyethylmethacrylate) cross-linked with suitable agents, the copolymerisation of hydroxyethylmethacrylate monomer with dimethacrylate ester crosslinking agents, poly(ethylene oxide) based polyurethanes prepared through the reaction of hydroxyl-terminated poly(ethylene glycols) with polyisocyanates or by the reaction with diisocyanates in the presence of polyfunctional monomers such as triols, and cellulose derivates cross-linked with dialdehydes, diepoxides and polybasic acids. Thirdly, incorporation of hydrophilic monomers and polymers into block and graft copolymers, examples being block and graft copolymers of poly(ethylene oxide) with suitable polymers, poly(vinyl pyrrolidone)-co-polystyrene copolymers, polyurethanes and polyurethaneureas and polyurethaneureas based on poly(ethylene oxide), polyurethaneureas and poly(acrylonitrile)-co-poly(acrylic acid) copolymers, and a variety of derivatives of poly (acrylontriles), poly(vinyl alcohols) and poly(acrylic acids). Fourthly molecular complex formation between hydrophilic polymers and other polymers, examples being poly(ethylene oxides) hydrogel complexes with poly(acrylic acids) and poly(methacrylic acids). Lastly, entanglement cross-linking of high molecular weight hydrophilic polymers, examples being hydrogels based on high molecular weight poly (ethylene oxides) admixed with polyfunctional acrylic or vinyl monomers.

It is possible to produce hydrogels which are physically extremely weak when swollen in water so that they flow either under their own weight or under low shear. However, the preferred hydrogels are characterized in that when swollen fully with water they do not flow under their own weight. Preferably they have also significant strength so that they can transmit the osmotic pressure which develops within their structure when they swell in water. A further desirable but not essential feature is that they are tough and not brittle materials in the dry (or xerogel) non-hydrated state; that is xerogel materials which exhibit a glass transition temperature ($T_g$) well below ambient temperature are preferred. Preferably the $T_g$ is below conceivable use temperatures of the cable. Many hydrogel materials have high $T_g$ values well above ambient temperatures and may be brittle and weak in use on extreme flexing. They can, however, be utilized as such extreme flexing is rarely encountered.

A preferred group of hydrophilic polymer comprising hydrogels are Poly(ethylene glycols) (PEGs) based hydrogels either crosslinked or made as chain-extended or block copolymers. Such crosslinked copolymers can be made via the reaction of the hydrogel ends of the PEGs with a diisocyanate and a polyol. These are known as polyurethanes and are described for example in UK Patent No. GB 2047093B, UK Patent No. 1506473, European Patent Application Publication No. 0205815 and International Patent Application (PCT) Publication No. WO89/07117. The block copolymers of PEGs can also be made utilising only difunctional units such as, for example, a combination of poly (ethylene glycol), poly(propylene glycol), a diisocyanate and optionally a diamine.

A further preferred group of hydrophilic polymer comprising hydrogels are based on linear chain-extended poly (ethylene oxide) polyurethaneurea hydrogels (UK GB22354620) and a series of linear poly(ethylene oxide)-co-poly(propylene oxide) block copolymer polyurethaneurea hydrogels. These polyurethaneurea (PUU) materials are able to absorb and swell in aqueous media, while retaining their mechanical integrity. The degree to which the polymeric hydrogels will absorb and swell with aqueous solutions is determined by the amount of hydrophilic poly (ethylene oxide) (PEO) incorporated within their structures. The higher the PEO content, the greater the swellability of the hydrogel material. The PUU hydrogels, when swollen, can have equilibrium aqueous media contents ranging from 5–95% by weight at ambient temperature. The hydrogels also exhibit changes in swelling with variations in temperature and may be described as "temperature responsive hydrogels."

As a result of their linear structure and chemical composition, the PUU hydrogels are soluble in a number of relatively "mild" organic solvents such as methanol, ethanol, propan-2-ol, methyl ethyl ketone, dichloromethane and chloroform. The solubility of the PUU hydrogels means that they can be readily fabricated into films or devices by solvent casting techniques or used in coating applications. The absorption of aqueous media by the PUU hydrogels produces an increase in their physical dimensions and this change can be used to exert a mechanical force or pressure. The speed and extent of the swelling and dimensional response of the PUU hydrogels is determined by their degree of hydrophilicity, governed by the PEO content, their physical dimensions and to the temperature of the system. The poly(ethylene oxide) based PUU hydrogel systems have an inverse swelling response in aqueous media with increasing temperature. A swollen PUU hydrogel will decrease in swelling as the temperature of the system is increased. The decrease in swelling of the PUU hydrogel will result in a contraction of the physical dimensions of the material which can be used to produce a mechanical response. The hydrogels described can be manufactured by various known processes and have the advantage that they are solvent soluble and therefore can be made in a form suitable for coating. They are also thermoplastic and may be extruded into fibres from the melt (with or without plasticizers). The nature of such materials is explained in "Polymer Science and Materials", Tobolsky, A. V. M. and Mark, H. F., Wiley-Interscience 1971.

The poly(ethylene oxide) based polyurethaneurea hydrogels can be used in combination with poly(acrylic acids) or poly(methacrylic acids) to produce pH responsive hydrogels through the formation of macromolecular, hydrogen-bonded association complexes between the polyether and the polyacid segments within the hydrogel structures. These materials are soluble in solvent systems and are therefore suitable for the production of pH responsive hydrogel films and coatings. It has been demonstrated that the PUU/polyacid complexed membranes have a low to high swelling response at about pH4.0 in citrate/phosphate buffer systems over the range pH2.2–pH8.0.

The swelling behaviour of poly(acrylamide-co-acrylic acid) copolymer gels in response to changes in ionic strength and pH, indicate that swelling responses can also occur in environments of different ionic strengths and at both low and high pH values. At very low pH the poly(acrylamide-co-acrylic acid) gel will deswell to the volume of an unionised gel. As the pH is increased the gel will increase in swelling as the acid groups become ionised until at high pH values, (>pH10), the gel begins to deswell due to the increased concentration of cations within the gel. It has been shown that the PUU/polyacid hydrogels display this type of swelling response at high pH values(pH10–pH12).

A further group of hydrophilic polymers comprising Polymeric microgels have been developed (UK patent GB2090264B), via a solution polymerisation process, comprising crosslinked particles which are capable of forming a sol in the reaction solvent. These crosslinked particles or microgels can be designed to have specific functionalities, reactivities, solubility and size. Basic poly (methylmethacrylate-co-(dimethylamino) ethylmethacrylate) microgels have been developed which, when incorporated into a PUU hydrogel matrix produce pH responsive hydrogel materials which exhibit a change in swelling at about pH6–7. The versatility of the microgel process means that microgels can be prepared which will respond to any chosen external stimuli. For example, microgels incorporating acidic and/or basic groups will respond to changes in pH and/or ionic strength, poly (hydroxyethylmethacrylate-co-dinitrophenol)microgels will respond to the presence of amines, poly (hydroxyethylmethacrylate-co-azobenzoate) microgels will respond to UV radiation and poly(N,N-alkyl substituted acrylamides) based microgels will have a swelling response in relation to the system temperature.

These microgels can, in a two component system with a PUU hydrogel matrix, or a carrier or binder produce responsive hydrogel materials, which swell or deswell i.e. shrink, on exposure to the specific target measurand.

Numerous geometrical embodiments of the probe assembly 12 are possible, as will now be explained with reference to FIGS. 4–8.

In FIGS. 3A and 3B the fibre 14 is linearly co-located in intimate contact with (or in very close proximity to) a hydrogel coating 16 carried by a central supporting former 20 (which forms part of the containment system 18). The volumetric change of the hydrogel coating 16, on exposure to the target measurand, is transduced into the required deformation of the optical fibre 14 by restraining the optical fibre 14 from radial movement at regular intervals along the length of the fibre 14 as indicated by the arrows. In FIG. 3A the restraining effect is implemented symmetrically but in FIG. 3B it is implemented non-symmetrically. The preferred arrangement is a periodicity coincident with achieving resonant or near resonant power transfer from a guided mode in the optical fibre 14 to an unguided mode, or an integral multiple of such a periodicity.

Physical implementations of the FIG. 3A arrangement are depicted in FIGS. 4A and 4B, and of the FIG. 3B arrangement in FIGS. 4C and 4D. FIG. 4A uses C-shaped clamps 22; FIG. 4B uses restraining O-rings 24; FIG. 4C uses a single restraining wire 26 wound as a helix; and FIG. 4D uses multiple restraining wires 28 wound as helices.

In FIG. 5 the optical fibre 14 is sandwiched between a body of hydrogel 16 and a primary restraining braid 30 formed of a helically wound suitable material (e.g. nylon, kevlar, steel) and a secondary restraining braid 32 of similar material. The secondary braid 32 material may in some instances also serve as a chemically porous mechanical support.

FIG. 6 uses only the helical winding of the primary restraining braid 30. In FIGS. 5 and 6, the applied stress is not uniform along the optical fibre 14 length but is concentrated periodically at the position of the individual windings of the restraining braid 30.

In FIGS. 7A and 7B a profiled coating 34 is applied to the optical fibre 14. The coating is non-uniform along the optical fibre 14, by for example, incorporating some particulates in the coating mix. The effect of the particulate is to act as a local stress concentrator. The hydrogel 16 volumetric change exerts a uniform hydrostatic pressure which through the inhomogeneity of the coating 34 is transduced into a microbend loss in the fibre 14.

Figure 8A:
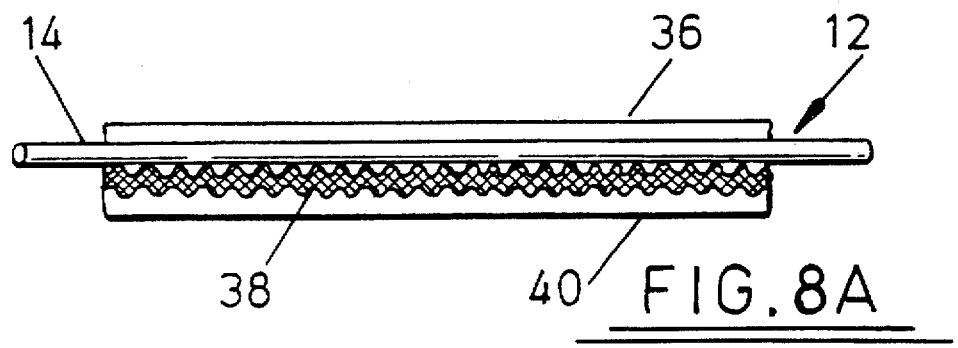
Figure 8B:
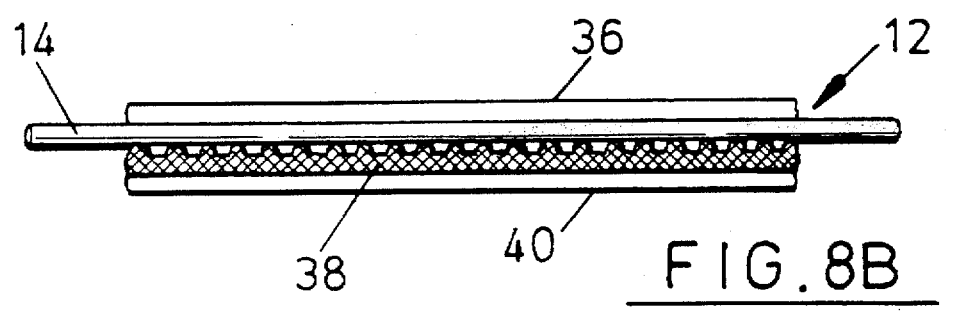
Figure 8C:
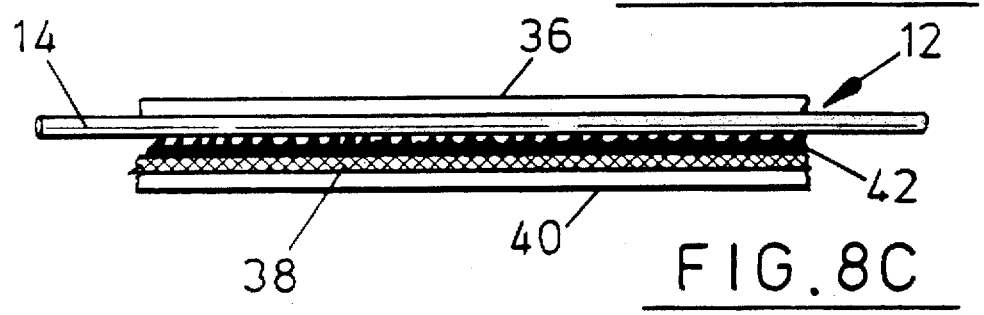
Figure 8D:
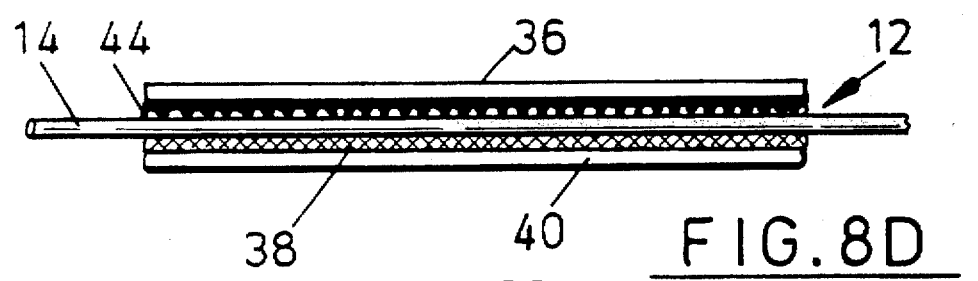
Figure 8E:
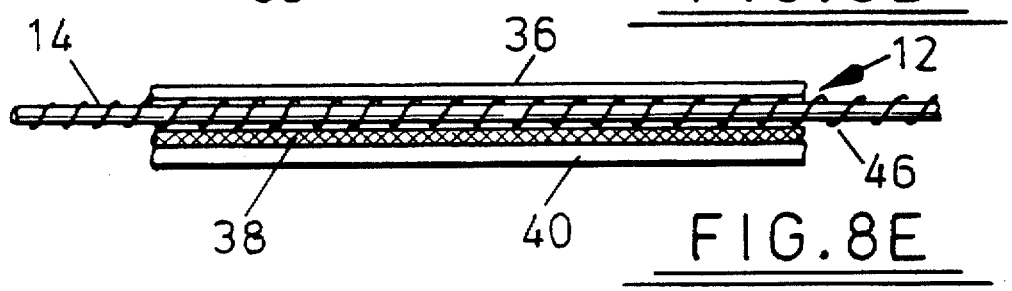

In situations where a flat, or rectangular implementation is required any one of the arrangements shown in FIGS. 8A–E can be implemented. In these arrangements the optical fibre 14 is located between a planar restraining plate 36, and a hydrogel layer 38, (cross-hatched) and a bottom restraining plate 40. FIG. 8A uses the hydrogel layer 38 on the profiled bottom restraining plate 40; FIG. 8B uses the profiled hydrogel layer 38 on the bottom restraining plate 40; FIG. 8C uses an additional profiled restraining plate 42 on the flat hydrogel layer 38; FIG. 8D uses an additional profiled restraining plate 44 on the top restraining plate and FIG. 8E uses a restraining wire 46 on the optical fibre 14.

In all the probe assemblies 12 which have been described, the response time and the magnitude of the response can be tailored through the appropriate selection of periodicity of disturbance, thickness of the hydrogel 16, stiffness of the hydrogel 16, stiffness of supporting former 20 and or the use of additional buffering layers.

For example, a probe assembly 12 as previously described containing a hydrogel 16 of the composition found in Example 1 gives a 0.04 dB/m loss in backscatter intensity for a hydrogel coating of 20 microns and a 0.1 dB/m loss in backscatter intensity for a hydrogel coating of 45 microns. The time taken to detect a response is in the region of 15–20 seconds.

It will be understood that whereas current OTDR systems are capable of detecting changes in backscatter intensity of around 0.01 dB, for a calibrated change of between 0.01–0.05 dB/m (in the presence of the targeted substance) probe assembly lengths of between 200 m and 1 km can be interrogated, assuming a dynamic range of 10 dB.

The detection system of the present invention may be utilised as a quality assurance tool to ensure that grout extends through the entire duct of a post-tensioned reinforced concrete section. For such an application, the hydrogel 16 is selected to swell on exposure to hydroxyl ions, when the concentration of such ions exceeds a predetermined value, for example to produce a pH of 10 or above, which level of ions is present in the wet grout. Thus the absence of grout at any point in the duct is detectable as an area of low loss, associated with localized non-swelling of the hydrogel 16.

A modified form of the detection system may be used to monitor both the quality of grout filling and the subsequent ingress of moisture. This system has twin probe assemblies with different hydrogels one being sensitive to the pH levels of 6 and greater, and the other being sensitive to pH levels of 10 and greater. The outputs from the sensor assemblies are combined in a simple truth table to identify the condition of the concrete section.

EXAMPLE 1

Synthesis of a Linear Block Copolymer Polyurethaneurea Hydrogel.

Materials

| | |
|---|---|
| dry Poly(ethylene glycol) PEG 5860 | 1 mol |
| dry Poly(propylene glycol) PPG 425 | 10 mol |
| 4,4'-Methylenedianilene MDA | 0.824 mol |
| 4',4'-Dicyclohexylmethane diisocyanate - (Desmodur W) | 12.415 mol |

Catalyst=0.2 mg $FeCl_3$/g total reactants.

Procedure

Dry PPG425 was mixed with the $FeCl_3$ catalyst and placed in an oven at 95° C. until the catalyst had dissolved. The MDA was then added and the mixture returned to the oven, with occasional stirring, at 95° C. until the diamine had completely dissolved and the reaction mix was visibly homogeneous. Molten, dry PEG5860 was then added to the molten mixture and stirred vigorously before being returned to the oven to equilibrate to 95° C. The Desmodur W was then added to the mixture rapidly, inside a fume cupboard. The mixture was then stirred vigorously for 2 minutes and the reacting melt was then transferred to preheated polypropylene moulds and placed in the oven at 95° C. for 20 hours. The polymer was then removed from the moulds and swollen in water to remove any low molecular weight soluble fractions. The swollen polymer was then chopped into pieces and dried in air and then under vacuum to remove the water.

The PUU composition could then be dissolved in a 5% w/v solution of a suitable "mild" organic solvent, from which films and coatings could be cast.

We claim:

1. A detecting system for use in detecting the presence of a target measurand, said system comprising:

a fibre-optic probe assembly (12) incorporating an optical fibre (14) which is subject to micro bending at intervals along its length, the probe assembly (12) comprising a rigid containment structure (18) which is filled with the length of optical fibre (14) and a body of material (16) which is subject to a volumetric change in the presence of said target measurand, said body of material comprising a hydrogel based polymer formed from an organic solvent soluble hydrogel and wherein said body of material is in the form of a thin film having a dry thickness of less than 50 microns; and a sensor assembly (10) coupled to the probe assembly, the sensor assembly (10) having optical signal transmitting and receiving means arranged to identify optical fibre microbend changes arising, in use, from forces imposed locally on the fibre (14) by the interaction of the rigid containment structure (18) and volumetric changes in the body of material (16).

2. A detecting system as claimed in claim 1 wherein the hydrogel based polymer comprises, radiation or radical cross-linked hydrophilic polymers.

3. A detecting system as claimed in claim 1 wherein the hydrogel based polymer comprises, chemical cross-linked hydrophilic polymers and monomers, with appropriate polyfunctional monomers.

4. A detecting system as claimed in claim 1, wherein the hydrogel based polymer comprises, block and graft copolymers comprising hydrophilic monomers and polymers.

5. A detecting system as claimed in claim 1, wherein the hydrogel based polymer comprises, hydrophilic polymers molecularly complexed to other polymers.

6. A detecting system as claimed in claim 1, wherein the hydrogel based polymer comprises, entanglement cross-linked high molecular weight hydrophilic polymers.

7. A detecting system as claimed in claim 1, wherein the body of material (16) further comprises a non-responsive carrier or binder.

8. A detecting system as claimed in claim 1 wherein the hydrogel based polymer comprises, a microgel.

9. A detecting system as claimed in claim 1, wherein the containment structure (18) comprises a sheath which is porous to the target measurand.

10. A detecting system as claimed in claim 1, wherein the containment structure (18) comprises a sheath which is non-porous but is reactive with the target measurand so as to be corroded in the presence of the target measurand.

* * * * *